March 16, 1971 C. W. SOSINSKI 3,570,096
MODULE EXTRACTION TOOL

Filed April 26, 1968 3 Sheets-Sheet 1

INVENTOR.
CHARLES W. SOSINSKI
BY
ATTORNEY

March 16, 1971
C. W. SOSINSKI
3,570,096
MODULE EXTRACTION TOOL
Filed April 26, 1968
3 Sheets-Sheet 2
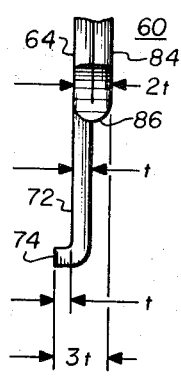
FIG.4
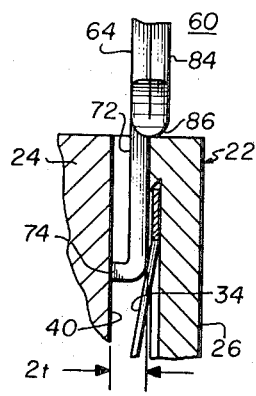
FIG.5
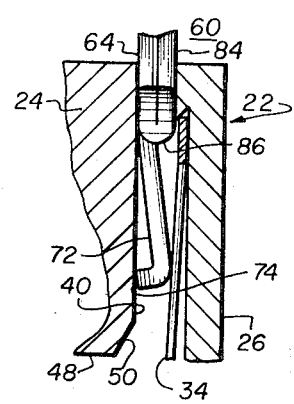
FIG.6
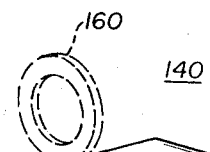
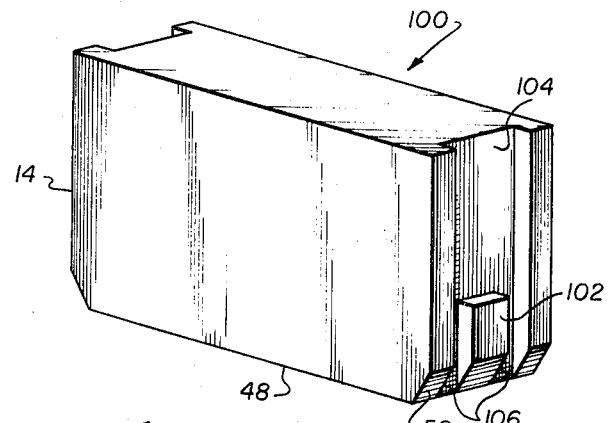
FIG.7
FIG.8
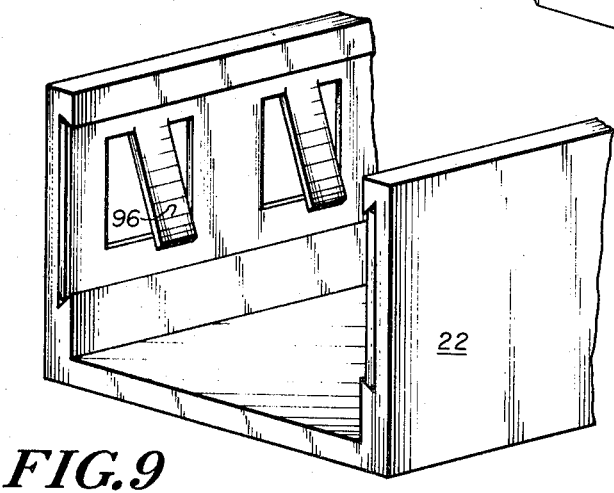
FIG.9
INVENTOR.
CHARLES W. SOSINSKI
BY
ATTORNEY March 16, 1971     C. W. SOSINSKI     3,570,096

MODULE EXTRACTION TOOL

Filed April 26, 1968     3 Sheets-Sheet 3

INVENTOR
CHARLES W. SOSINSKI

BY

ATTORNEY

Patented Mar. 16, 1971

3,570,096
MODULE EXTRACTION TOOL
Charles William Sosinski, Linden, N.J., assignor to The Thomas & Betts Co., Elizabeth, N.J.
Filed Apr. 26, 1968, Ser. No. 731,671
Int. Cl. B25b 27/02
U.S. Cl. 29—203          6 Claims

ABSTRACT OF THE DISCLOSURE

The disclosure is directed to a tool for removing modules from a module mounting rail assembly without disturbing adjacent modules. The tool is constructed of first and second parallel arms joined by a third transverse arm to permit placement of the first and second arms adjacent the sides of a module to be extracted. The first and second arms each terminate in at least one projection, each projection in turn terminating in an inturned rib to grasp the module for removal. Additional arms, in parallel with the first and second arms, help position the nibs in the mounting rail and tabs may be added to such additional arms to further control the positions of the nibs.

CROSS-REFERENCES TO RELATED APPLICATIONS (1) Module Mounting System, Ser. No. 724,033, filed Apr. 25, 1968, by Charles W. Sosinski.

(2) Module, Ser. No. 750,265, filed Aug. 5, 1968, by Charles W. Sosinski.

(3) Module Mounting System, Ser. No. 749,833, filed Aug. 2, 1968, by Charles W. Sosinski.

(4) Module System, Ser. No. 756,254, filed Aug. 29, 1968, by Charles W. Sosinski.

The above listed applications are assigned to the assignee of the instant application.

BACKGROUND OF THE INVENTION

Field of the invention

The invention is directed to the field of interconnecting electrical components and conductors wherein such conductors and components are arranged in modules mounted in module mounting systems.

Description of the prior art

In one of the prior art module mounting systems which are currently available for sale, individual modules are mounted in a U-shaped channel, which channel, surrounds two sides and the back of the module leaving the front of the module exposed. Projections downwardly from the sides of the U-shaped channel protrude over the front portion of the module preventing its being removed through said open face except by the use of removal slots provided at specific intervals along the mounting rail. Once a module has been moved along the mounting rail to a removable slot, screw drivers, shims or similar types of device may be inserted between the module and the mounting rail to pry the module out of the rail. Unfortunately, it has been found that in many instances the conductors, or components, mounted upon the module are grasped by persons wishing to remove the module and are used for such purposes. The application of forces to the conductors, or the components, places undue stress upon them and may result in a disconnect of the conductors or the components, often without the disconnect being noticed, having occurred within the module itself. The prying, by use of a screw driver, or similar devices, of modules from the mounting rail has the effect often of destroying the seals of the module and damaging the module casing and causing the deformation and springing of the mounting rail which will prevent it from properly supporting modules placed therein.

SUMMARY OF THE INVENTION

The present invention seeks to overcome the difficulties noted above in respect to prior art methods of removing modules from module mounting systems. Due to the unique mounting system described in the above cited copending application number 1 individual modules are retained by the engagement of flexure members in steps on the sides of the modules themselves. These flexure members, in their normal position, extend downwardly toward the closed end of the channel and inwardly, thus impeding the movement of the module into position in the mounting rail. The flexure members, however, are deflected by means of the module as they are placed in the mounting rail and upon engagement with a locking step are permitted to return towards their initial position. Once the flexure members have been extended to contact the step in locking engagement such locking engagement prevents the withdrawal of modules from the mounting rail. In order to remove the contact between the step of the module and the flexure members it is necessary to displace the flexure members to a position where such engagement no longer exists and to lift, or provide a handle means for lifting, the module from the mounting rail. The present invention provides a module extraction tool which provides for the removal of the locking engagement between the flexure means and the module, the gripping of the module and a handle for readily removing the module from the mounting rail.

In first embodiments of the module extraction tool a generally U-shaped member is formed having first and second parallel arms and a third arm which not only provides for the proper spacing of the first and second arms but which further provides a ready handle by which the module, once seized by the first and second arms, may, be withdrawn from the module supporting rail. Mounted, either directly at the ends of the first and second arms, or upon projections connected thereto are a plurality of inturned nibs which when positioned along the back surface of the module permit the module to be grasped and withdrawn from the mounting rail while at the same time assuring disengagement of the flexure restraining members from the steps of the module. In other embodiments of the device, apertures are provided in the first and second parallel arms to receive therein complementary tabs placed on the side of the modules to permit the withdrawal of the modules at the same time as the flexure restraining devices are held out of contact with locking steps on the modules themselves. In each instance the extraction tool is fabricated from a flat, flexible, resilient material such that the necessary springing effects may be provided by the interaction between various portions of the tool and the walls of the mounting rail and module. Such flexure also permits the release of the module from the extraction tool once the module has been removed from the mounting rail. It is therefore an object of this invention to provide an improved form of module extraction tool.

It is yet another object of this invention to provide a module extraction tool which permits the release of the locking members between the mounting rail and the module and which facilitates the removal of the module from the mounting rail.

It is still another object of this invention to provide a module extraction tool which can, by the simple exertion of external force, be positioned to engage and release module locking mechanism and permit the withdrawal of the module from a mounting rail and which can further be used for release of the module from the tool once the module has been withdrawn from the mounting rail.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings:

FIGS. 4, 5 and 6 are front views of the portions of module extraction tool of FIG. 3. FIGS. 5 and 6 show the various positions of the tool of FIG. 3 as it is employed to withdraw a module from a mounting rail.

FIG. 7 is a perspective view of an alternative embodiment of a module extraction tool constructed in accordance with the concepts of the invention.

FIG. 8 is a perspective view of a further module configuration shown in FIG. 7 of copending application number 1 and which requires the module extraction tool of FIG. 7.

FIG. 9 is a perspective view of a portion of a mounting rail shown in FIG. 6 of copending application number 1 and which is employed to reain the module of FIG. 8.

Similar elements are given similar reference characters in each of the respective figures.

DESCRIPTION OF THE PREFERRED EMBODIMENTS

Figure 2:
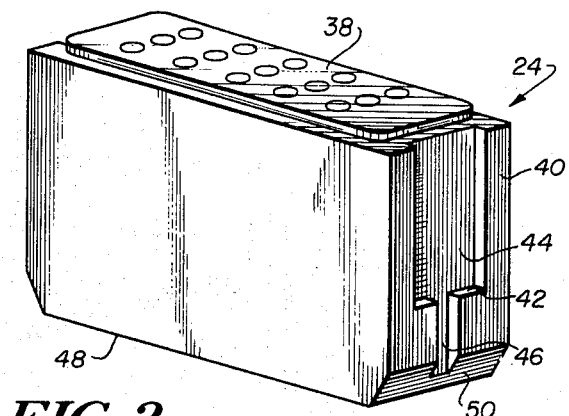
FIG. 2 is a perspective view of a module for use with the mounting rail of FIG. 1 and illustrated in FIG. 2 of copending application number 1.
Figure 1:
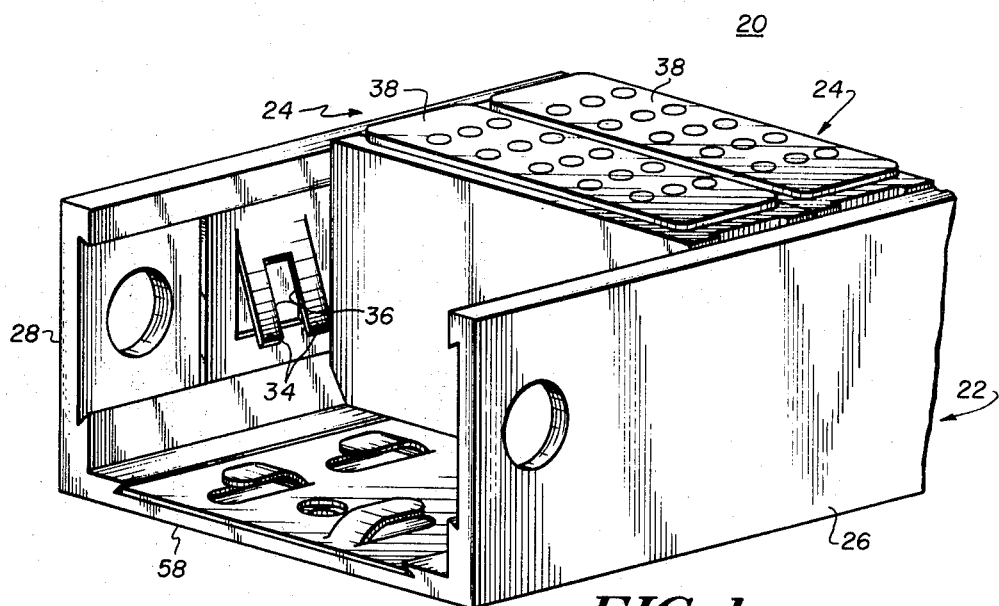
FIG. 1 is a perspective view of a portion of a mounting rail showing the mounting of individual modules therein and illustrated in FIG. 1 of copending application number 1 listed above.

Turning now to FIGS. 1 and 2 there is shown a module mounting system 20, more fully described in the above cited Sosinski application, entitled "Module Mounting System." Modules 24 are positioned along mounting rail 22 and between side wall 26 and side wall 28 which are adjacent the side walls 40 of the module 24. The further wall 58 abuts the bottom 48 of the module 24. Mounted along the side walls 26 and 28, only one of which is visable in FIG. 1, are a plurality of bifurcated flexure members 34. Individual tines 36 of the bifurcated flexure member 34 extend in a direction generally downwardly towards the member 58 and inwardly towards one another. As is better seen in FIG. 2, side wall 40 of module 24 has therein a step 42 which will engage the free ends of the flexure member 34. A channel 44 cut from the top surface of the side wall 40 to a position such as to form the step 42. A further channel 46 exists from the step 42 to the bottom of the module 24. The edges which define the intersection between the bottom 48 of the module 24 and the side face 40 are chamfered as at 50 to assist in the insertion of the module 24 in mounting rail 22. Modules 24 are inserted, without the aid of tools, into positions within the mounting rail 22 adjacent pairs of flexure member 34. Forces are then exerted upon the module 24, as by applying force to the front face 38 thereof, which cause the flexure member 34 to move generally downwardly and towards their respective walls 26 and 28. The chamfered surfaces 50, of the module 24, assist in such deflection of the flexure members 34. The flexure members 34 continue to be held downwardly and outwardly until such time as the step 42 passes the free end of the flexure members 34 at which time flexure members 34 are permitted to move upwardly and inwardly and contact the step 42 in locking engagement therewith. As a result of this locking engagement between the free ends of the flexure members 34 and the step 42, module 24 may no longer be withdrawn from the mounting rail 22.

Figure 3:
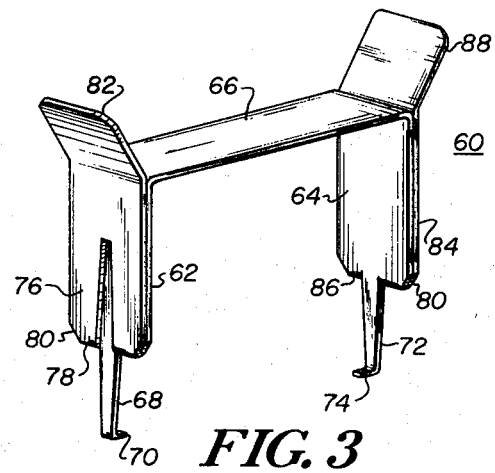
FIG. 3 is a perspective view of a module extraction tool constructed in accordance with the concepts of this invention.

Turning now to FIG. 3, there is shown a tool 60 for extracting modules 24 from the mounting rail 22. Module extraction tool 60 is fabricated of flat, flexible, resilient material such that it may be deflected by finger force or by the engagement between mounting rail 22 and the module 24. Module extraction tool 60 consists of a first arm 62 and a second arm 64 which are generally parallel with one another. A third arm 66, generally perpendicular to first arm 62 and second arm 64, supports the first and second arm 62 and 64 respectively and positions them from one another a distance sufficient to accept a module 24 therebetween. Extending from the first arm 62 is a projection 68 which terminates in a first inturned nib 70. Second arm 64 terminates in a second projection 72 and a second inturned nib 74. A fourth arm 76, generally parallel with the first arm 62 and extending along arm 62, is coupled to arm 62 as at the fold 78. The juncture between first arm 62 and fourth arm 78 is rounded to minimize interference with the module 24 in the mounting rail 22 and is also tapered at its ends as at 80. Arm 76 terminates in an outwardly turned tab 82. To the second arm 64 is coupled a fifth arm 84 coupled as at fold 86. This coupling 86 is rounded and the edges are tapered as at 80. Arm 84 also terminates in an upwardly and outwardly extending tab 88. The application of forces to the tabs 82 and 88 towards one another will cause the spreading of the inturned nibs 70 and 74 thus releasing a module 24 which will be caught therebetween, in a manner to be described below. Further, the movement of the tabs 82 and 88 in directions away from one another will cause the nibs 70 and 74 to move towards one another and permit the grasping of a module 24 for extraction.

Turning now to FIGS. 4, 5 and 6 the manner of operation of the module extraction tool 60, of FIG. 3, with respect to a module 24 and a mounting railing 22 can be better appreciated. As is shown in FIG. 4, the thickness of projection 72, the first arm 64 and the fifth arm 84 are each equal to "$t$." The combined thickness of arms 64 and 84 is therefore "$2t$." In addition, the inwardly turned nib 74 has a length of "$t$" measured from its free end to the closest surface of arm 64. As a result the thickness of the tool 60, measured from the free end of the inturned nibs 74 to the most remote surface of the arm 84, is $3t$." As is shown in FIG. 5, the spacing between the side wall 40 of the module 24 and the side wall 26 of the mounting rail 22 is equal to "$2t$." Initially, the tool 60 is positioned so that the nib 74 of projection 82 fits into the clearance space between side wall 40 of module 24 and side wall 26 of mounting rail 22. As a result of the tool thicknesses, the tool 60 may only be moved within the clearance space until coupling 86 of the arms 64 and 84 contacts the top surface of the side wall 26 of mounting rail 22, at which time further downward movement of the tool 60 is prevented. Inward pressure, however, on the arms 84 and 64 in a direction to the left of FIG. 5, will cause a buckling of the projection 72 as is shown in FIG. 6 and permit the entry of the arms 64 and 84 into the clearance space between the side 40 of module 24 and the side 26 of the mounting rail 22. As is shown in FIG. 6, projection 72 will take on a distorted position until such time as the nib 74 is able to pass the chamfered area 50 and engage the bottom surface 48 of the module 24. The contact between the arms 64 and 84 with flexure member 34 will cause the displacement of the flexure member 34 from locking engagement with step 48. The projection 72 and nib 74 will merely pass through the slot between the bifurcated ends 36 of flexure member 34. FIG. 6 shows flexure member 34 deflected for illustrative purposes only so that the action of projection 72 may be better appreciated. At this time an upward force on the third arm 66, as shown in FIG. 3, will permit withdrawal of the module 24 from the mounting rail 22.

Turning now to FIGS. 7, 8 and 9 a further embodiment of the module extracting tool 140, constructed in accordance with the concepts of the invention may be appreciated. The module of FIG. 8, more fully described in copending application number 1 comprises a module 100 having a step 102 and a communicating channel 104 from the top surface of the module 100 to the step 102. In addition, two bi-pass channels 106 are provided which go from the channel 104 about the step 102, pass the chamfer 50 to the bottom surface 48 of the module. This module is arranged to fit in a mounting rail 22, as is shown in FIG. 9 and more fully described with reference to FIG. 6 of the copending application number 1. A single tine, flexure member 96, is employed to engage the step 102 and retain the module 100 of FIG. 8 within the mounting rail 22. In order to remove the module 100 from mounting rail 22 of FIG. 9 the tool 140, of FIG. 7, is employed. Module extraction tool 140 has a first arm 142 and a second parallel arm 144. Arms 142 and 144 are mounted upon a third arm 146 which serves to position and hold apart the arms 142 and 144 a distance sufficient to accommodate a module 100 therebetween. First arm 142 terminates in dual projections 148, each of which terminates in inturned nibs 150. The projections 148 are made of the same width as the channels 106 of the module 100 of FIG. 8. The material removed in order to form the projections 148 is bent up to form respectively fourth and fifth arms 152 and 154. The fifth arm 154 is visable in FIG. 7 while the fourth arm 152 occupies the position similar to that shown with respect to 154 but on the right hand side of the extraction tool 140. Arm 144 terminates in projections 156, each of which terminates in inwardly projecting nibs 158. The projections 148 and 156 are each of a thickness "$t$" whereas the combined thicknesses of the first and fourth arms, 142 and 152 and the second and fifth arms 144 and 154, are equal to "$2t$." Again the projections with the inwardly turned nibs 150 and 158 are also equal to "$t$" and therefore the overall effective thickness from the free ends of the nibs 150 and 158 to the outward extremes of the fourth and fifth arms, 152 and 154 respectively, is equal to "$3t$." Therefore in operation of the module extraction tool of FIG. 7 the same type of interference is caused with the tool is inserted between the module 24 and the mounting rail 22 upon the contact of the coupling between the arms 142 and 152 and 144 and 154 respectively. The same type of inward forces must be exerted upon the arms 142, 152 and 144 and 154 in order that the tool 140 be employed as described above with reference to FIGS. 4, 5 and 6. The projections 148 will be allowed to seat within the channels 106 on the left hand side of the module 100 of FIG. 8 (not shown) whereas the projections 156 will seat within the channels 106 on the right hand portion of the module 100. Once the nibs 150 and 158 have cleared the chamfered areas 50 of the module, the nibs 150 and 158 will engage with the bottom surface of the module 100 to permit its being withdrawn. The operation of the module extraction tool 140 is in all other manner similar to the operation of tool 60 of FIG. 3. If desired, a handle 160, as shown in dashed lines may be added to the third arm 146 to make removal of the module simpler. In a similar manner a handle of this type may be added to all the embodiments of the module extraction tool described herein.

Figure 10:
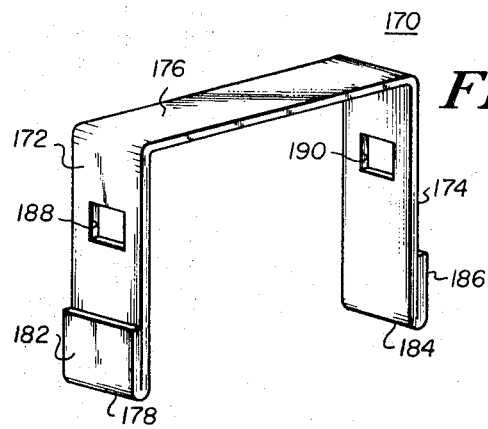
FIG. 10 is a perspective view of a further embodiment of a module extraction tool constructed in accordance with the concepts of the invention.
Figure 11:
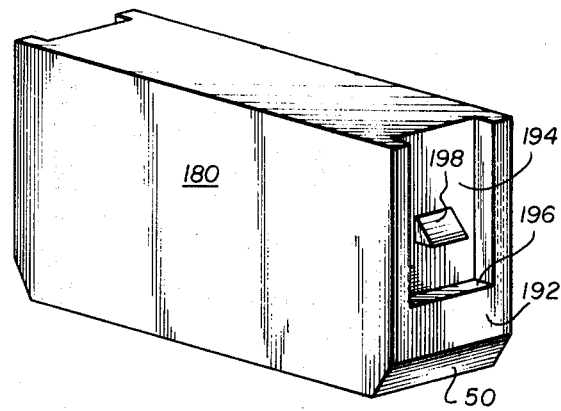
FIG. 11 is a perspective view of a module with which the tool of FIG. 10 is employed.

Turning now to FIG. 10 there is shown a further modification of a module extraction tool 170 to be employed with the module 180 of FIG. 11. Module extraction tool 170, has a first arm 172, a second arm 174 and a third arm 176 connected thereto. The function of the third arm 176 is the same as that described with reference to the third arm 66 of FIG. 3. The end of first arm 172 is upturned as in 178 to form a fourth arm 182. In a similar manner the second arm 174 is upturned as at 184 to form a fifth arm 186. The arms 182 and 186 extend only a portion of the distance up arms 172 and 174, thus only in the portion where arms 172 and 182 exist concurrently is the thickness therein "$2t$." In a similar manner, at the concurrence between the arms 174 and 186 the thickness is also "$2t$" and the remaining portion of arms 172 and 174 has a thickness of "$t$." Positioned within the first arm 172 is an aperture 188 while arm 174 has an aperture 190.

Module 180, as is shown in FIG. 11, has a side wall 192 in which is positioned a channel 194. Channel 194 provides at its bottom surface a locking step 196. Also positioned within the channel 194 is an outwardly extending tab 198. When the module extraction tool 170 of FIG. 10 is positioned within the interspace between the side wall 192 of the module 180 and the side wall 26 of the mounting rail 22 it will not be necessary for the mounting tool to penetrate as deeply into the mounting rail 22 as was necessary with the devices of FIGS. 3 and 7, instead the module extraction tool 170 will be inserted to such a depth that the bottom edges, or couplings, 178 and 184 of the tool 170 seat themselves against the step 196 on both sides of the module 180. At this time, due to the double thickness of the arms 172, 182 and 174 and 186 the apertures 188 and 190 will be positioned to engage with the tabs 198. Tabs 198 as is seen, has an inclined face towards its top surface and a surface perpendicular to the remaining portion of the channel 194 at its bottom. The inclined top face will facilitate the movement of the coupling 178 and 184 thereover and the bottom surface of the tab 198 will permit seating of the tab 198 in the apertures 188 and 190. Extraction of the module 180 is accomplished by means of the forces exerted upon the third arm 176 transmitted through the aperture 188 and 190 to the tabs 198 of the module 180.

Figure 12:
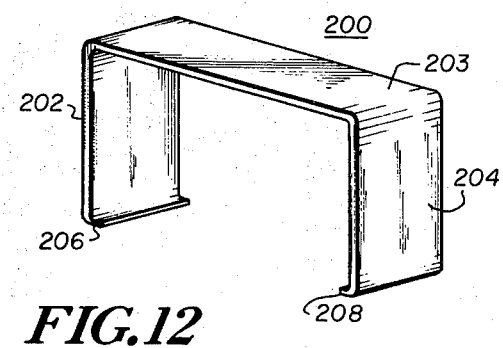
FIG. 12 is a perspective view of a further embodiment of a module extraction tool constructed in accordance with the concepts of the invention.
Figure 13:
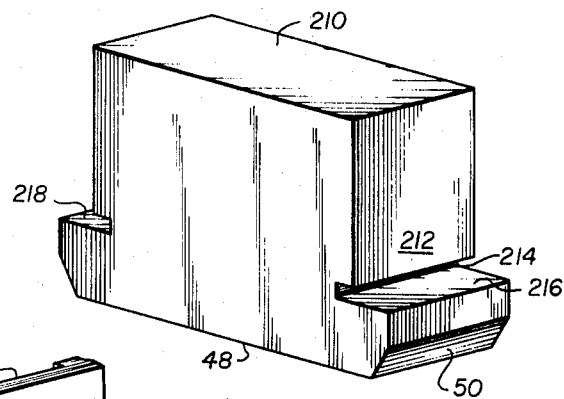
FIG. 13 is a perspective view of a module with which the tool of FIG. 12 is employed.
Figure 14:
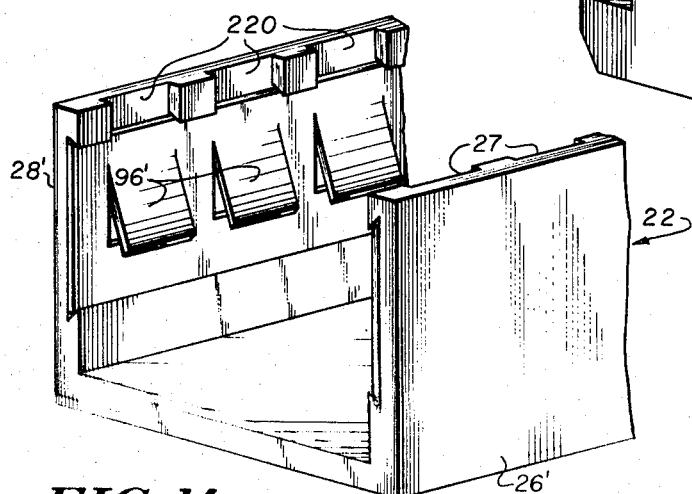
FIG. 14 is a perspective view of a portion of a mounting rail modified for employment of the module of FIG. 13 and the tool of FIG. 12.

Turning now to FIG. 12 there is shown a further module extraction tool 200 constructed in accordance with the concepts of the invention. Tool 200 has a first arm 202 of a thickness "$2t$" and a second parallel arm 204 also of a thickness "$2t$." At the end of arm 202 is an inturned nib 206 while arm 204 terminates in an inturned nib 208. Nibs 206 and 208 also extend for a distance of "$t$" making the overall thickness from the free ends of the nibs 206 and 208 to the back surface of the respective arms 202 and 204 of "$3t$." Flexure of the arms 204 and 202 will be necessary in the manner described with reference to the tool 60 and as described with reference to FIGS. 4, 5 and 6. Module 210 of FIG. 13 has a side wall 212 which has cut therein a transverse slot 214 and extends outwardly to form a step 216 which then moves downwardly and through a chamfered area 50 to a bottom surface 48. The opposite side, not visable in FIG. 13, is similar to the right hand side wall 212. It contains a transverse slot 218. To extract the module 210, of FIG. 13, tool 200 of FIG. 12 is positioned so that the turned nibs 206 and 208 ride the side walls 212 of the module. Downward force on the third arm 203, of the tool 200, causes the nibs 206 and 208 to move downwardly until they engage the steps 216 and due to the resiliency and flexibility of the tool 200 the nibs 206 and 208 are allowed to move inwardly and take up positions within the transversed slots 216 and 218. An upward force on the third arm 203 of the tool 200 will now extract the module 210. To accommodate the thickness of the module extraction tool 200 it is necessary that the side walls 26' and 28' of the mounting rail 22', of FIG. 14, be modified to include slots 220 adjacent the flexure members 96'. The depth of the slots 220 are approximately equal to "*t*" and therefore the entire thickness of the tool is accepted at least at the top of the side walls 26' and 28'. Inward flexure of the side walls 202 and 204 of the tool 200 is necessary to move the free ends of the inturned nibs 206 and 208 to a position where they can occupy the transverse slots 216 and 218 to permit withdrawal of module 210.

While there have been shown and described and pointed out the novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A module extraction tool for removing a module from a mounting rail assembly comprising: first and second generally parallel arms; a third arm having first and second ends; one of said first and second arms being coupled to a first one of said ends and the second of said first and second arms being coupled to the other of said first and second ends; at least a portion of said third arm being perpendicular to said first and second arms; said first and second arms being spaced along said third arm by a distance sufficient to accept a module therebetween; first inturned nib means on said first arm generally extending in the direction of said second arm; and second inturned nib means on said second arm generally extending in the direction of said first arm; the spacing between said first and second nib means being established by an externally applied force to said first and second arms; at least one first projection means coupled between said first arm and said first nib means; at least one second projection means coupled between said second arm and said second nib means; said first and second projection means each being narrower than their respective arms.

2. A module extraction tool, as defined in claim 1, further comprising: a fourth arm coupled to said first arm adjacent the coupling between said first arm and said first projection; said fourth arm extending in parallel with at least a portion of said first arm and a fifth arm coupled to said second arm adjacent the coupling between said second arm and said second projection; said fifth arm extending in parallel with at least a portion of said second arm.

3. A module extraction tool, as defined in claim 2, further comprising: a first tab coupled to the free end of said fourth arm; said first tab extending beyond said third arm and a second tab coupled to the free end of said fifth arm; said second tab extending beyond said third arm; whereby the application of an external force to said first and second tabs causes the increased separation of said first and second nib means.

4. A module extraction tool, as defined in claim 3, wherein said first tab extends at angle to said fourth arm and said second tab extends at an angle to said fifth arm.

5. A module extraction tool, as defined in claim 1, wherein said first and second nib means each comprise two nibs and said first and second projection means each comprise two projection arms; the two projection arms of said first projection means coupled to said first arm; said two projection arms of said first projection means each being narrower than said first arm and providing a first channel therebetween, one of said two nibs of said first nib means being coupled to each of said two projection arms of said first projection means; the two projection arms of said second projection means coupled to said second arm; the two projection arms of said second projection means each being narrower than said second arm and providing a second channel therebetween; one of said two nibs of said second nib means being coupled to each of the two projection arms of said second projection means.

6. A module extraction tool, as defined in claim 5, further comprising: a fourth arm coupled to said first arm adjacent an edge of said first channel and extending in parallel with at least a portion of said first arm; and a fifth arm coupled to said second arm adjacent an edge of said second channel and extending in parallel with at least a portion of said second arm.

References Cited

UNITED STATES PATENTS

| 1,521,689 | 1/1925 | King | 81—43 |
| 3,100,931 | 8/1963 | Barnes | 29—203 |
| 3,377,689 | 4/1968 | Kimmett | 29—206X |
| 3,443,297 | 5/1969 | Lubsy, Jr. | 29—206X |

THOMAS H. EAGER, Primary Examiner

U.S. Cl. X.R.

29—206

UNITED STATES PATENT OFFICE
CERTIFICATE OF CORRECTION

Patent No. 3,570,096　　　　　　　　　Dated　March 16, 1971

Inventor(s)　Charles William Sosinski

It is certified that error appears in the above-identified patent and that said Letters Patent are hereby corrected as shown below:

Column 1, line 5, "Thomas & Betts Co." should be

-- Thomas & Betts Corporation --.

Column 3, line 34, "reain" should be -- retain --.

Column 5, line 54, "with" should be -- when --.

Signed and sealed this 7th day of September 1971.

(SEAL)
Attest:

EDWARD M. FLETCHER, JR.　　　　ROBERT GOTTSCHALK
Attesting Officer　　　　　　　　Acting Commissioner of Patent

FORM PO-1050 (10-69)　　　　　　　　　　　　　　　　　　USCOMM-DC 6037